United States Patent
Tomimoto (10) Patent No.: US 10,358,050 B2
(45) Date of Patent: Jul. 23, 2019

(54) FUEL CELL VEHICLE AND METHOD FOR CONTROLLING FUEL CELL VEHICLE

(71) Applicants: KABUSHIKI KAISHA TOYOTA JIDOSHOKKI, Kariya-shi, Aichi-ken (JP); TOYOTA JIDOSHA KABUSHIKI KAISHA, Toyota-shi, Aichi-ken (JP)

(72) Inventor: Naoya Tomimoto, Kariya (JP)

(73) Assignees: KABUSHIKI KAISHA TOYOTA JIDOSHOKKI, Kariya-shi, Aichi-ken (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/796,943

(22) Filed: Oct. 30, 2017

(65) Prior Publication Data
US 2018/0126868 A1 May 10, 2018

(30) Foreign Application Priority Data
Nov. 4, 2016 (JP) .................. 2016-216688

(51) Int. Cl.
*B60L 1/00* (2006.01)
*B66F 9/22* (2006.01)
(Continued)

(52) U.S. Cl.
CPC ............. *B60L 15/20* (2013.01); *B60L 1/003* (2013.01); *B60L 15/2045* (2013.01); *B60L 50/40* (2019.02); *B60L 58/13* (2019.02); *B60L 58/40* (2019.02); *B66F 9/07572* (2013.01); *H01M 8/0494* (2013.01); *H01M 8/04656* (2013.01);
(Continued)

(58) Field of Classification Search
CPC ... B60L 15/20; B60L 11/1883; H01M 8/0494; H01M 16/003; H01M 2250/20; B66F 9/07572; B66F 9/22
See application file for complete search history.

(56) References Cited

U.S. PATENT DOCUMENTS 5,929,594 A 7/1999 Nonobe et al.
2009/0236182 A1 9/2009 Yamagami
(Continued)

FOREIGN PATENT DOCUMENTS

JP 62-70198 A 3/1987
JP 2007-335411 A 12/2007
(Continued)

*Primary Examiner* — Michael J Zanelli
(74) *Attorney, Agent, or Firm* — Sughrue Mion, PLLC (57) ABSTRACT

A fuel cell vehicle includes a fuel cell stack, which is connected to an in-vehicle electric load, a power storage device, which is connected to the fuel cell stack so as to be connected in parallel to the in-vehicle electric load, a state-of-charge sensor, which detects a state of charge of the power storage device, and circuitry that controls the power generated by the fuel cell stack based on the detected state of charge of the power storage device. The in-vehicle electric load includes a driving motor, which is driven based on operation of an operating member. When the state of charge of the power storage device detected by the state-of-charge sensor falls to or below a threshold value, the circuitry executes a restriction process to apply restriction on driving of the driving motor.

5 Claims, 6 Drawing Sheets

(51) Int. Cl.
*B60L 15/20* (2006.01)
*B60L 50/40* (2019.01)
*B60L 58/13* (2019.01)
*B60L 58/40* (2019.01)
*B66F 9/075* (2006.01)
*H01M 16/00* (2006.01)
*H01M 8/04537* (2016.01)
*H01M 8/04828* (2016.01)

(52) U.S. Cl.
CPC ....... H01M 16/003 (2013.01); *B60L 2200/42* (2013.01); *B60L 2240/421* (2013.01); *B60Y 2200/91* (2013.01); *B60Y 2300/60* (2013.01); *B60Y 2400/11* (2013.01); *B66F 9/22* (2013.01); *H01M 2250/20* (2013.01); *Y02T 10/7258* (2013.01); *Y02T 90/32* (2013.01)

(56) References Cited

U.S. PATENT DOCUMENTS

| | | | |
|---|---|---|---|
| 2010/0068575 A1* | 3/2010 | Manabe | H01M 8/04111 429/422 |
| 2011/0137501 A1* | 6/2011 | Lee | B60L 3/0092 701/22 |
| 2013/0157157 A1* | 6/2013 | Skidmore | H01M 8/04298 429/428 |

FOREIGN PATENT DOCUMENTS

| | | |
|---|---|---|
| JP | 2009-232556 A | 10/2009 |
| JP | 2014-082056 A | 5/2014 |

* cited by examiner

FUEL CELL VEHICLE AND METHOD FOR CONTROLLING FUEL CELL VEHICLE

BACKGROUND OF THE INVENTION

The present invention relates to a fuel cell vehicle equipped with a fuel cell system and a method for controlling the fuel cell vehicle.

Vehicles (for example, forklifts and other industrial vehicles) equipped with fuel cell systems have been in practical use. In the fuel cell system disclosed in Japanese Laid-Open Patent Publication No. 2014-82056, in-vehicle electric loads are connected to a fuel cell stack. Also, a capacitor, which serves as a power storage device, is connected to the fuel cell stack so as to be connected in parallel with the in-vehicle electric loads. When the generated power of the fuel cell stack exceeds the power required by the in-vehicle electric loads, the surplus power is used to charge the capacitor. In contrast, when the generated power falls below the power required by the in-vehicle electric loads, the capacitor discharges the power corresponding to the insufficiency.

For example, when the vehicle goes up a steep hill with a heavy cargo, the power that the fuel cell system is required to generate exceeds the rating of the fuel cell system, so that the power of the capacitor is used. If such a situation continues for a long time or frequently occurs, the state of charge (SOC) of the capacitor decreases, leading to a possibility of overdischarge of the capacitor. In order to prevent the capacitor from overdischarging and to protect the capacitor, it is necessary to stop the fuel cell system and shut down the other systems of the vehicle in an emergency.

However, such a system shut-down would hinder operations where the vehicle is used and thus should be avoided as much as possible.

SUMMARY OF THE INVENTION

Accordingly, it is an objective of the present invention to provide a fuel cell vehicle and a method for controlling the fuel cell vehicle that are capable of preventing a situation where a fuel cell system is shut down in order to protect a power storage device.

To achieve the foregoing objective and in accordance with one aspect of the present invention, a fuel cell vehicle is provided that includes an in-vehicle electric load, a fuel cell stack, which is electrically connected to the in-vehicle electric load, a power storage device, which is electrically connected to the fuel cell stack so as to be electrically connected in parallel to the in-vehicle electric load, a state-of-charge sensor, which is configured to detect a state of charge of the power storage device, and circuitry that is configured to control a power generated by the fuel cell stack based on the state of charge of the power storage device detected by the state-of-charge sensor. The in-vehicle electric load includes a driving motor that is configured to be driven based on operation of an operating member. The circuitry is configured such that, when the state of charge of the power storage device detected by the state-of-charge sensor falls to or below a threshold value, the circuitry executes a restriction process to apply restriction on driving of the driving motor.

In accordance with another aspect of the present invention, a method for controlling a fuel cell vehicle is provided. The fuel cell vehicle includes a driving motor that is configured to be driven based on operation of an operating member, a fuel cell stack, which is electrically connected to the driving motor, and a power storage device, which is electrically connected to the fuel cell stack so as to be electrically connected in parallel to the driving motor. The method includes: detecting a state of charge of the power storage device; controlling a power generated by the fuel cell stack based on the detected state of charge of the power storage device; and executing a restriction process to apply restriction on driving of the driving motor when the detected state of charge of the power storage device falls to or below a threshold value.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A forklift according to one embodiment of the present invention will now be described with reference to the drawings.

Figure 1:
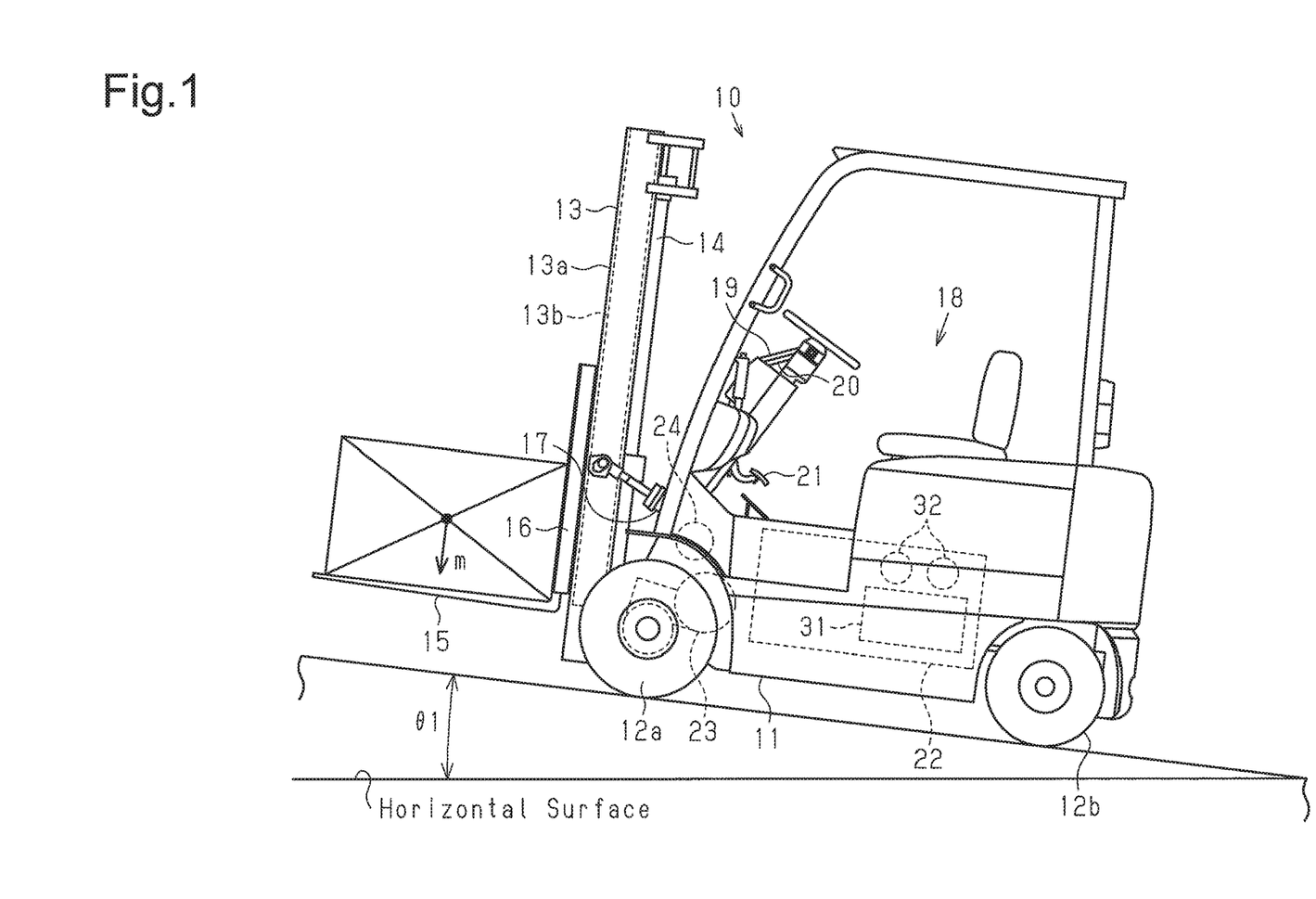
FIG. 1 is a schematic side view of a fuel cell forklift according to one embodiment.

As shown in FIG. 1, a fuel cell forklift 10 has drive wheels (front wheels) 12a in the front lower part of a vehicle body 11 and steered wheels (rear wheels) 12b in the rear lower part of the vehicle body 11. An upright mast 13 is provided in front of the vehicle body 11. The mast 13 is composed of a pair of left and right outer masts 13a and an inner mast 13b. The outer masts 13a are supported so as to tilt back and forth with respect to the vehicle body 11. The inner mast 13b slides up and down with respect to the outer masts 13a. A lift cylinder 14 as a cargo handling cylinder is arranged at the rear of each outer mast 13a. A lift bracket 16 provided with a fork 15 is supported inside the inner mast 13b so as to be movable up and down. The fork 15 is raised and lowered together with the lift bracket 16 by the extension and retraction of the lift cylinders 14.

The forklift 10 includes a pair of left and right tilt cylinders 17, which serve as cargo handling cylinders. Each tilt cylinder 17 has a proximal end, which is pivotally coupled to the vehicle body 11, and a distal end, which is pivotally coupled to the side of the corresponding outer mast 13a. The mast 13 is tilted forward or rearward when the tilt cylinders 17 are extended or retracted.

A lift lever 19 and a tilt lever 20 are arranged at the front part in an operator cab 18. The lift lever 19 is an operating member for raising and lowering the fork 15, and the tilt lever 20 is an operating member for tilting the mast 13 forward or rearward. An accelerator pedal 21 as an operating member is provided at the lower part in the operator cab 18. The vehicle speed is controlled in accordance with the operated amount of the accelerator pedal 21.

The vehicle body 11 mounts a fuel cell system 22, a traveling motor 23, and a cargo handling motor 24. The fuel cell system 22 drives the traveling motor 23, which in turn drives the drive wheels 12a. Specifically, the output shaft of the traveling motor 23 is coupled to the rotary shafts of the drive wheels 12a via a speed reducer 25 (see FIG. 2). When the traveling motor 23 drives and rotates its output shaft, the rotation of the output shaft rotates the rotary shafts of the drive wheels 12a, so that the drive wheels 12a are driven.

Figure 2:
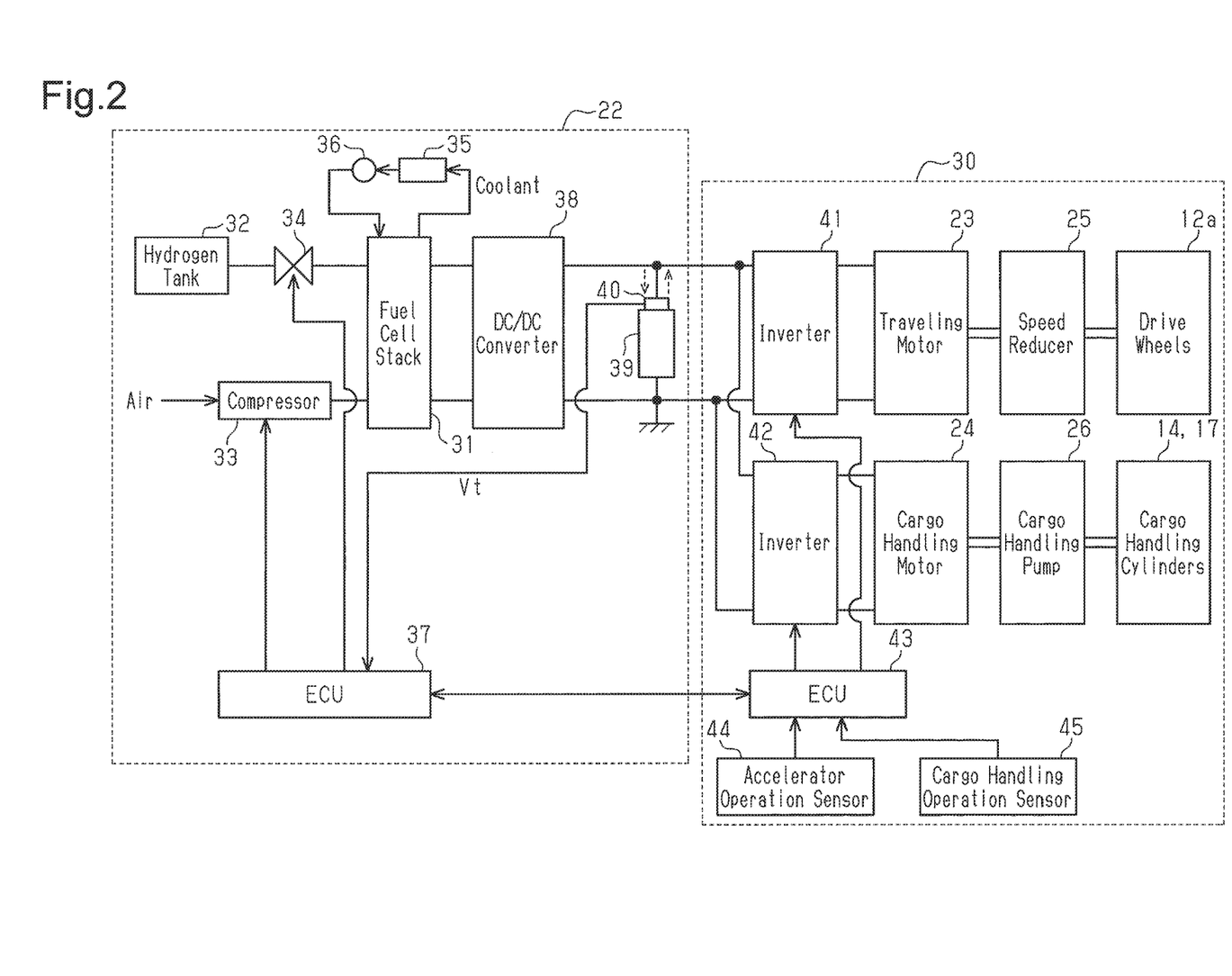
FIG. 2 is a schematic diagram of a fuel cell system and a vehicle system.

Also, the fuel cell system 22 drives the cargo handling motor 24, which in turn drives a cargo handling pump 26 (see FIG. 2). The driving of the cargo handling pump 26 causes the cargo handling cylinders, or the lift cylinder 14 and the tilt cylinders 17, to extend or retract, so that the fork 15 is vertically moved and tilted. The cargo handling motor 24 serves as a hydraulic drive source for the lift cylinder 14 and the tilt cylinders 17.

As described above, the fuel cell system 22 is used as a power source for the cargo handling motor 24 and the traveling motor 23.

Next, with reference to FIG. 2, the fuel cell system 22 and a vehicle system 30 will be described.

As shown in FIG. 2, the fuel cell system 22 includes a fuel cell stack 31, a hydrogen tank 32, a compressor 33, an electromagnetic valve 34, a radiator 35, a water pump 36, an electronic control unit (hereinafter referred to as a fuel cell system ECU) 37, a DC/DC converter 38, a capacitor 39 as a power storage device, and a terminal voltage measuring device 40. The vehicle system 30 includes the traveling motor 23, the cargo handling motor 24, inverters 41 and 42, the speed reducer 25, the drive wheels 12a, the cargo handling pump 26, the cargo handling cylinders (the lift cylinder 14 and the tilt cylinders 17), an electronic control unit (hereinafter referred to as a vehicle ECU) 43, an accelerator operation sensor 44, and a cargo handling operation sensor 45.

Each of the fuel cell system ECU 37 and the vehicle ECU 43 may include a microcomputer and/or dedicated hardware (application specific integrated circuit: ASIC) for executing at least part of various procedures. That is, each of the fuel cell system ECU 37 and the vehicle ECU 43 may be circuitry including 1) one or more dedicated hardware circuits such as an ASIC, 2) one or more processors (microcomputers) that operate according to a computer program (software), or 3) a combination thereof.

The fuel cell stack 31 in the fuel cell system 22 is constituted by stacking a plurality of cells, and the cells are electrically connected in series. The hydrogen tank 32 is capable of supplying hydrogen gas to the fuel cell stack 31. The compressor 33 is capable of supplying air containing oxygen to the fuel cell stack 31. Hydrogen supplied from the hydrogen tank 32 and oxygen in the air supplied from the compressor 33 cause a chemical reaction in the fuel cell stack 31, which generates electric energy.

The electromagnetic valve 34 is provided in a pipe connecting the fuel cell stack 31 and the hydrogen tank 32 to each other. The electromagnetic valve 34 adjusts the amount of hydrogen gas supplied to the fuel cell stack 31. The electromagnetic valve 34 and the compressor 33 are controlled by the fuel cell system ECU 37.

The fuel cell stack 31 is connected to a coolant circulation route, in which the radiator 35 and the water pump 36 are provided. The radiator 35 includes a radiator fan (not shown). Circulation of coolant through the circulation route cools the fuel cell stack 31. The compressor 33, the water pump 36, the radiator fan, and the like are accessories in the fuel cell system 22 and are driven by the power of the fuel cell system 22.

The fuel cell stack 31 is connected to the capacitor 39 via the DC/DC converter 38. The capacitor 39 is connected to the traveling motor 23 and the cargo handling motor 24 via inverters 41 and 42, respectively. That is, the fuel cell stack 31 is electrically connected to the traveling motor 23 and the cargo handling motor 24 via the DC/DC converter 38, the capacitor 39, and the inverters 41, 42. The DC power generated by the fuel cell stack 31 is stepped down to a predetermined voltage by the DC/DC converter 38 and then delivered to the traveling motor 23 and the cargo handling motor 24 via the capacitor 39 and the inverters 41 and 42.

The traveling motor 23 and the cargo handling motor 24 are driving motors that are driven by operation of the operating members (the accelerator pedal 21, the lift lever 19, and the tilt lever 20) by the operator. The traveling motor 23 and the cargo handling motor 24 also correspond to in-vehicle electric loads, which are electric devices driven by power from the fuel cell system 22. That is, the in-vehicle electric loads include the cargo handling motor 24 and the traveling motor 23 for driving the axle. When the cargo handling motor 24 and the traveling motor 23 are driven by the power supplied from the fuel cell system 22, the cargo handling operation and the traveling operation are executed. In addition, the vehicle system 30 has accessories (not shown) such as lighting equipment and a power steering apparatus, and these accessories are driven by the power supplied from the fuel cell system 22.

The capacitor 39 is electrically connected to the fuel cell stack 31 so as to be connected in parallel with the in-vehicle electric loads (the traveling motor 23, the cargo handling motor 24, and the like). When the generated power of the fuel cell stack 31 exceeds the power required by the in-vehicle electric loads (the traveling motor 23, the cargo handling motor 24, and the like), the surplus power is used to charge the capacitor 39. In contrast, when the generated power falls below the required power, the power corresponding to the insufficiency is discharged from the capacitor 39. A terminal voltage measuring device 40 is attached to the capacitor 39. The terminal voltage measuring device 40 measures the terminal voltage Vt of the capacitor 39.

The fuel cell system ECU 37 estimates the state of charge (SOC) of the capacitor 39 based on parameters including the terminal voltage Vt of the capacitor 39 measured by the terminal voltage measuring device 40 and the internal resistance of the capacitor 39. In the present embodiment, the terminal voltage measuring device 40 and the fuel cell system ECU 37 constitute a state-of-charge detection means or a state-of-charge sensor, which detects the SOC of the capacitor 39. Based on the estimated SOC of the capacitor 39, the fuel cell system ECU 37 controls the opening degree of the electromagnetic valve 34 and the displacement of the compressor 33 to adjust the amounts of the hydrogen and oxygen supplied to the fuel cell stack 31, thereby controlling the power generated by the fuel cell stack 31. Specifically, based on the SOC of the capacitor 39, the fuel cell system ECU 37, which serves as a control means, switches the power generated by the fuel cell stack 31 among three stages, which are a predetermined minimum power (low power generation), a predetermined intermediate power (medium power generation), and a predetermined maximum power (high power generation). Such control of the power generation of the fuel cell stack 31 in the three predetermined stages without changing it continuously suppresses the fluctuation of the generated power, so that the deterioration of the fuel cell stack 31 is reduced.

The accelerator operation sensor 44 detects the operated amount of the accelerator pedal 21, and the vehicle ECU 43 controls the inverter 41 based on the operated amount of the accelerator pedal 21. The operated amounts of the lift lever 19 and the tilt lever 20 are detected by the cargo handling operation sensor 45, and the vehicle ECU 43 controls the inverter 42 based on the operated amounts of the lift lever 19 and the tilt lever 20. Through control of the inverters 41, 42, the speed of the traveling motor 23 is controlled, and the drive wheels 12a are driven via the speed reducer 25. Also, the speed of the cargo handling motor 24 is controlled and the cargo handling cylinders (the lift cylinder 14 and the tilt cylinder 17) are driven via the cargo handling pump 26.

In this manner, the fuel cell system 22 supplies power to the inverters 41, 42, which in turn supplies power to the traveling and cargo handling motors 23, 24, respectively. The rotation generated in the traveling motor 23 is decelerated by the speed reducer 25 and transmitted to the drive wheels 12a, so that the vehicle travels. The cargo handling motor 24 drives the cargo handling pump 26, so that the pressure or the flow rate of the hydraulic fluid is adjusted, and the lift cylinder 14 and the tilt cylinders 17 are operated.

The fuel cell system ECU 37 and the vehicle ECU 43 are connected to each other. Specifically, the fuel cell system ECU 37 and the vehicle ECU 43 can communicate with each other through a communication means such as serial communication or CAN communication, and the fuel cell system ECU 37 and the vehicle ECU 43 share information through communication. The fuel cell system ECU 37 and the vehicle ECU 43 may also communicate with each other via analog signals.

Operation of the fuel cell forklift 10 having the foregoing configuration will now be described.

Figure 3:
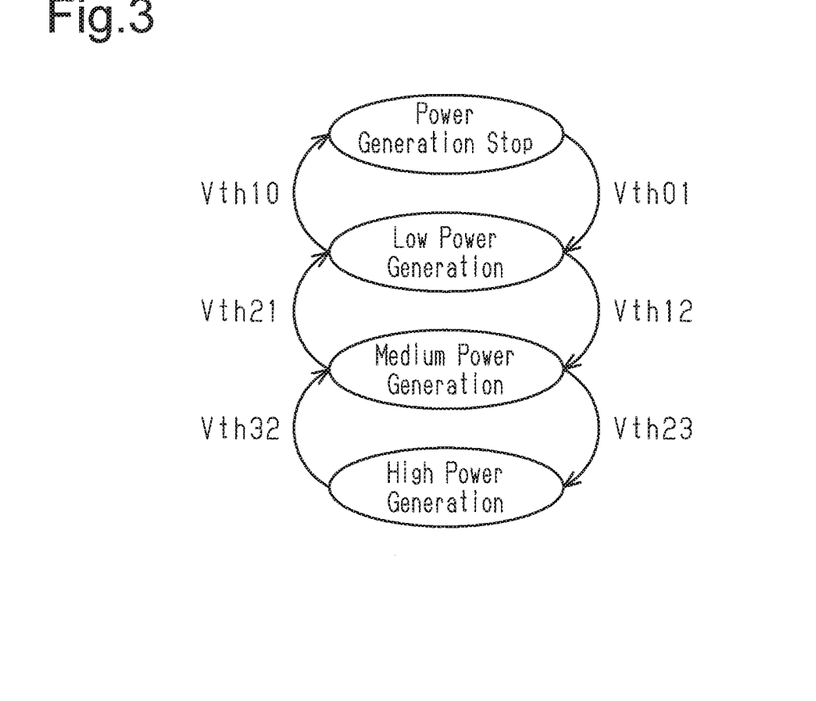
FIG. 3 is an explanatory diagram showing switching among power generation stop, low power generation, medium power generation, high power generation.

The fuel cell system ECU 37 controls the power generated by the fuel cell stack 31 in multiple stages while monitoring the SOC of the capacitor 39. Specifically, as shown in FIG. 3, when the SOC of the capacitor 39 falls below a threshold value Vth01 in a state where the fuel cell stack 31 is not generating power, the fuel cell system ECU 37 controls the power generation by the fuel cell stack 31 to be the low power generation. When the SOC exceeds a threshold value Vth10, which is greater than the threshold value Vth01, in the low power generation state, the fuel cell stack 31 stops generating power. When the SOC falls below a threshold value Vth12, which is less than the threshold value Vth01, in the low power generation state, the fuel cell system ECU 37 controls the power generation by the fuel cell stack 31 to be the medium power generation. When the SOC exceeds a threshold value Vth21, which is greater than the threshold value Vth12, in the medium power generation state, the fuel cell system ECU 37 controls the power generation by the fuel cell stack 31 to be the low power generation. When the SOC falls below a threshold value Vth23, which is less than the threshold value Vth12, in the medium power generation state, the fuel cell system ECU 37 controls the power generation by the fuel cell stack 31 to be the high power generation. When the SOC exceeds a threshold value Vth32, which is greater than the threshold value Vth23, in the high power generation state, the fuel cell system ECU 37 controls the power generation by the fuel cell stack 31 to be the medium power generation.

The maximum power generated by the fuel cell stack 31 in the high power generation state is determined from the specifications such as the number of cells constituting the fuel cell stack 31. When the fuel cell stack 31 generates power, the power for operating accessories (the compressor 33, the water pump 36, the radiator fan, and the like) in the fuel cell system 22 is required. Therefore, the power generated by the fuel cell system 22 is determined by the power (output power) generated by the fuel cell stack 31 and the power consumed by the accessories (loss).

The graphs of FIG. 5A to 5D represent, from the top, changes of the operated amount of the operating members (the accelerator pedal 21, the lift lever 19, and the tilt lever), the SOC of the capacitor 39, a restriction command, and the motor speed. At a point in time t1, the operated amount of the operating member is increased, and the motors 23, 24 are driven at high speeds, accordingly. This gradually decreases the SOC of the capacitor 39.

Figure 6:
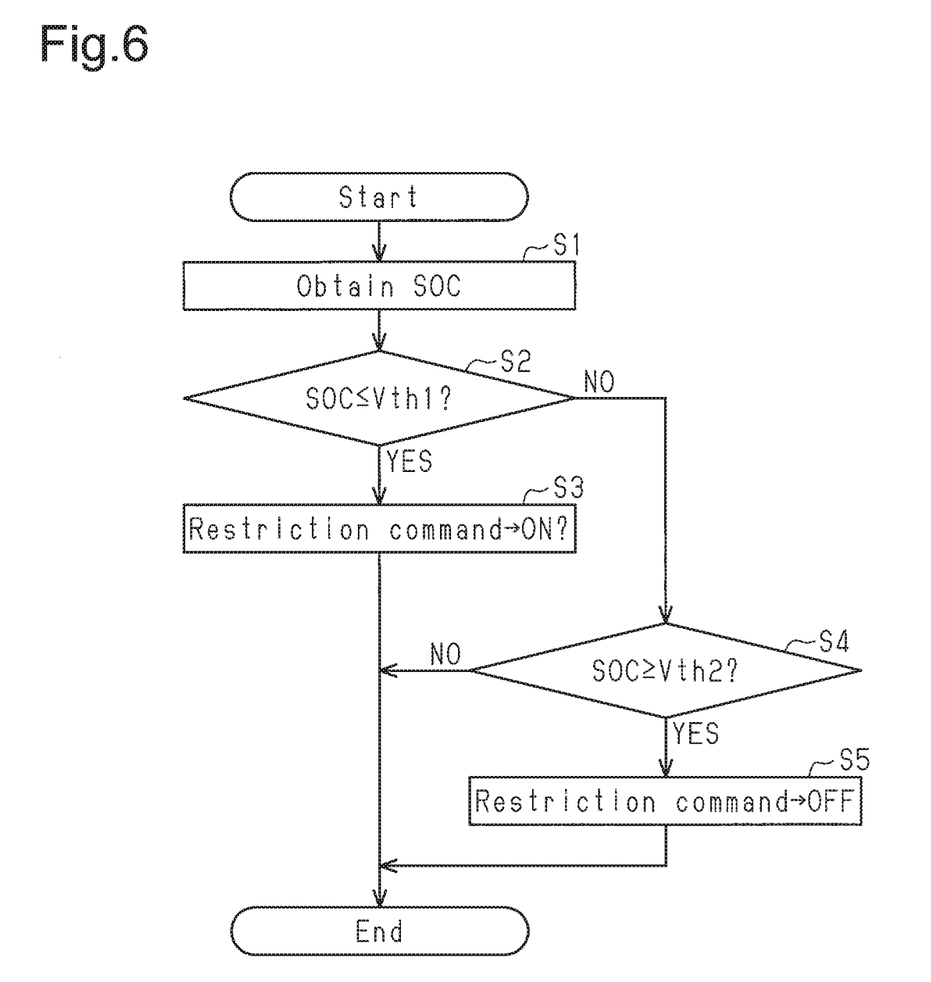
FIG. 6 is a flowchart of a procedure executed by a fuel cell system ECU.

The fuel cell system ECU 37 executes the procedure of FIG. 6. Also, the vehicle ECU 43 executes the procedure of FIG. 7.

Figure 7:
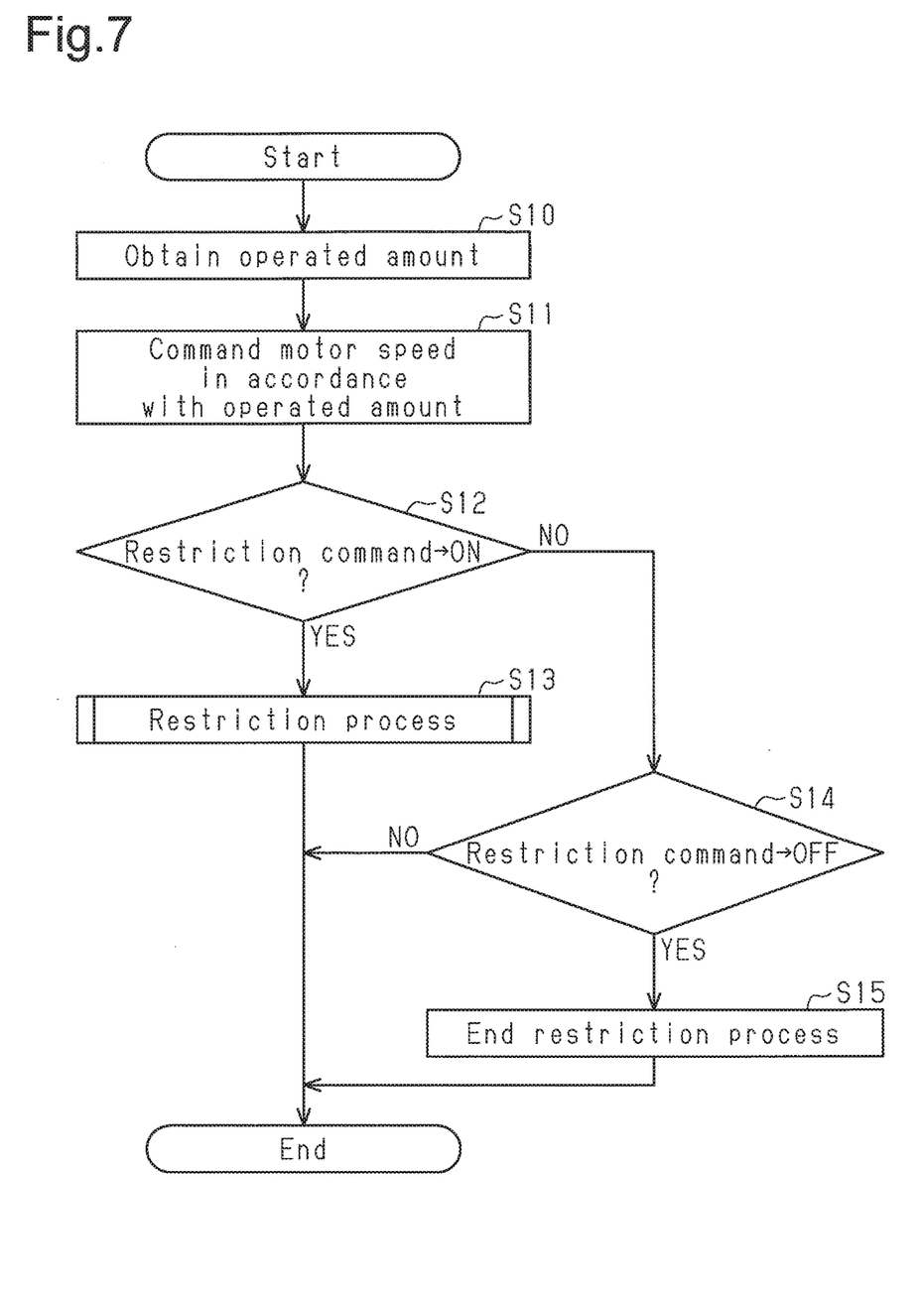
FIG. 7 is a flowchart of a procedure executed by a vehicle ECU.

The vehicle ECU 43 obtains the operated amounts of the operating members at step S10 of FIG. 7 and sends to the inverters 41, 42 the motor speeds corresponding to the operated amounts at step S11. Along with this, as shown in FIG. 5D, the motors 23, 24 start to be driven at high speeds at the point in time t1.

Figure 5A:
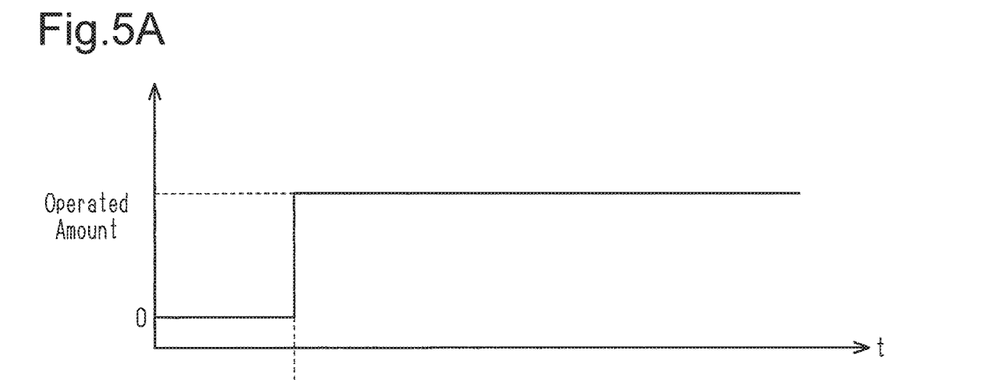
FIGS. 5A to 5D are time charts showing changes in the operated amount of the operating member, the SOC of the capacitor, the restriction command, and the motor speed.
Figure 5B:
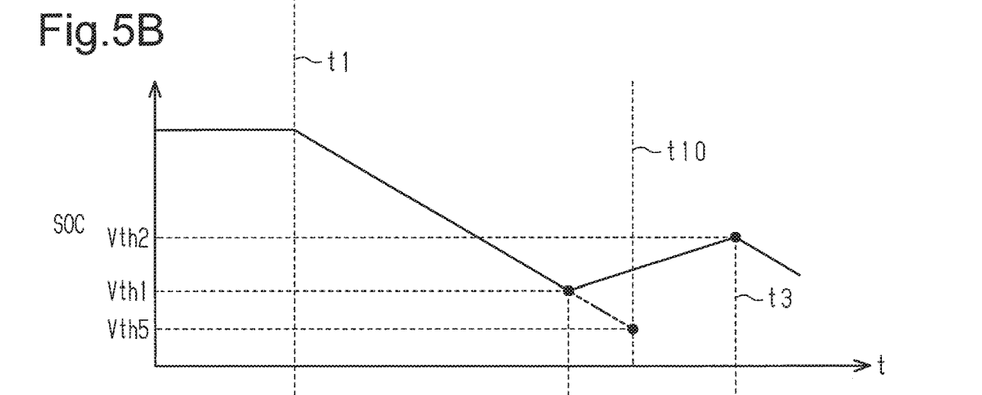

On the other hand, in FIG. 6, the fuel cell system ECU 37 obtains the SOC of the capacitor 39 at step S1 and determines whether the SOC of the capacitor 39 is less than or equal to the threshold value Vth1 at step S2 (see FIG. 5B).

Figure 5C:
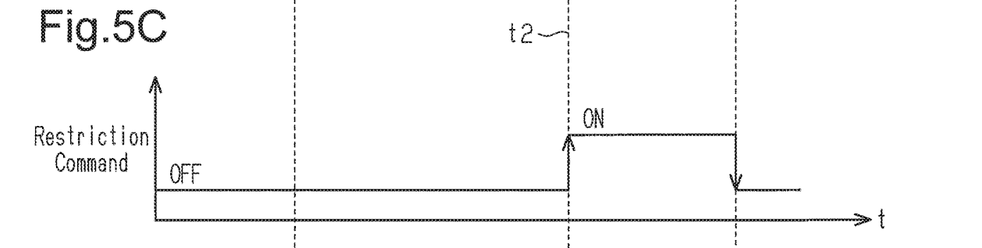
Figure 5D:
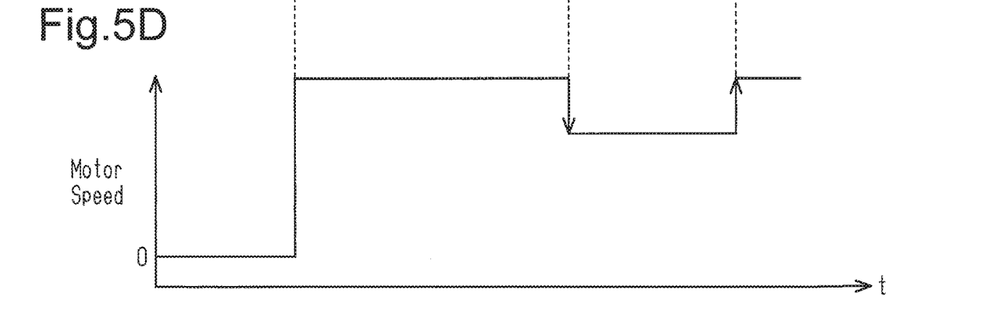

When the SOC of the capacitor 39 falls below the threshold value Vth1 at a point in time t2 as indicated in FIG. 5B, the fuel cell system ECU 37 proceeds to step S3 in FIG. 6. At step S3, the fuel cell system ECU 37 turns on the restriction command for the vehicle ECU 43 as shown in FIG. 5C so as to apply a restriction on the driving of the driving motors (the traveling motor 23 and the cargo handling motor 24). That is, the fuel cell system ECU 37 sends a restriction command signal to the vehicle ECU 43.

At step S12 in FIG. 7, the vehicle ECU 43 determines whether the restriction command is in the on state, that is, whether it has received the restriction command signal. When determining that the restriction command is in the on state, the vehicle ECU 43 executes a restriction process to restrict the speeds of the motors at step S13.

In FIGS. 5A to 5D, the restriction process is not performed before a point in time t2, and the in-vehicle electric loads (the motors 23, 24 and the like) are driven by the discharged power of the capacitor 39 in addition to the power generated by the fuel cell stack 31. When the restriction process is started at the point in time t2, the capacitor 39 does not discharge power and the speeds of the motors 23, 24 are adjusted such that the motors 23, 24 are driven by solely the maximum output power of the fuel cell stack 31.

The restriction process is executed taking into consideration the efficiency of the inverters 41, 42 in order to cover the motor output with the maximum power of the fuel cell system 22. Specifically, the output required by the fuel cell system 22 is determined based on the expression: the motor torque×the motor speed/the motor efficiency/the inverter efficiency. The motor torque×the motor speed corresponds to the motor output. The motor efficiency and the inverter efficiency are constantly estimated from the actual motor speed.

One example of the restriction process will now be described.

The restriction process is executed so that the following expression (1) is satisfied, thereby eliminating the necessity of discharge from the capacitor 39. In the expression, the output power of the fuel cell stack 31 is represented by A, the power consumed (loss) by the accessories such as the compressor 33, the water pump 36, and the radiator fan is represented by B, the drive force needed to drive the vehicle is represented by C, the drive force needed for the cargo handling operation is represented by D, and the loss due to other accessories such as the lighting equipment and the power steering apparatus is represented by E. The value of the subtraction A−B represents the power generated by the fuel cell system 22.

$$(A-B) > (\alpha 1 \times C + \alpha 2 \times D + E) \quad (1)$$

In the expression (1), $\alpha 1$ and $\alpha 2$ are weighting coefficients ($\alpha 1 + \alpha 2 = 1$). When the vehicle travels without performing cargo handling operation, $\alpha 1 = 1$, $\alpha 2 = 0$. When cargo handling operation is being performed without the vehicle traveling, $\alpha 1 = 0$ and $\alpha 2 = 1$. When cargo handling operation is being performed and the vehicle is traveling, $\alpha 1 = X$, $\alpha 2 = 1 - X$. The value X is determined arbitrarily.

The drive force C needed for traveling of the vehicle is calculated from the motor torque and the motor speed and is expressed, specifically, by the following expression (2). In the expression (2), the speed of the traveling motor 23 is represented by Ns, the torque of the traveling motor 23 is represented by Ts, the efficiency of the traveling motor 23 is represented by $\mu ms$, and the efficiency of the inverter 41 is represented by $\mu is$.

$$C = Ns \times Ts / \mu ms / \mu is \quad (2)$$

The drive force D needed for the cargo handling operation is calculated from the motor torque and the motor speed and is expressed by the following expression (3). In the expression (3), the speed of the cargo handling motor 24 is represented by Nn, the torque of the cargo handling motor 24 is represented by Tn, the efficiency of the cargo handling motor 24 is represented by $\mu mn$, and the efficiency of the inverter 42 is represented by $\mu in$.

$$D = Nn \times Tn / \mu mn / \mu in \quad (3)$$

Figure 4:
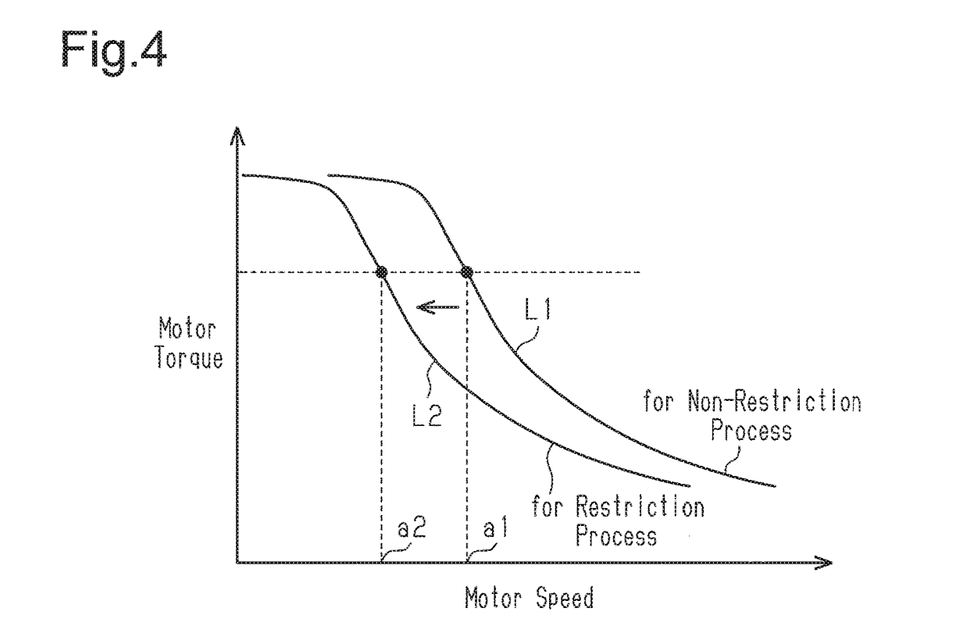
FIG. 4 is a graph showing the relationship between the driving motor speed and the torque.

The torque Ts of the traveling motor 23 is determined by the inclination $\theta 1$ of the road surface on which the vehicle is traveling and the weight M of the cargo mounted on the vehicle. The speed Ns of the traveling motor 23 is derived from the torque Ts using the characteristic lines L1 and L2 in the map of FIG. 4 prepared in advance. That is, the speed Ns corresponding to the operating point on the characteristic lines L1, L2 corresponding to the current torque Ts is selected. Also, the motor efficiency $\mu ms$ and the inverter efficiency $\mu is$ corresponding to the operating point are also obtained. The map of FIG. 4 is stored in the internal memory of the vehicle ECU 43.

The torque Tn of the cargo handling motor 24 is determined by, for example, the weight M of the cargo mounted on the vehicle. The speed Nn of the cargo handling motor 24 is derived from the torque Tn using a map similar to the map of FIG. 4. The motor efficiency $\mu mn$ and the inverter efficiency pin are also obtained in the same manner as in the case of the traveling motor 23.

As described above, when the detected SOC of the capacitor 39 falls below the threshold value Vth1, the fuel cell system ECU 37 sends a restriction command to the vehicle ECU 43 to apply restriction on the driving of the driving motors (the traveling motor 23 and the cargo handling motor 24). Thus, it is possible to prevent a situation where the fuel cell system 22 stops in order to protect the capacitor 39.

In particular, by performing the restriction process so as to satisfy the above expression (1), the output power of the fuel cell system 22 is maintained to be greater than or equal to the required power of the driving motors (the traveling motor 23 and the cargo handling motor 24). As shown in FIG. 5D, the restriction process is performed by adjusting the speeds of the driving motors (the traveling motor 23 and the cargo handling motor 24). Specifically, the map shown in FIG. 4 specifies the characteristic line L1 for a non-restriction process and the characteristic line L2 for the restriction process. In the characteristic line L2 for the restriction process, the motor speed is shifted to the lower speed side with respect to the characteristic line L1 for non-restriction process. That is, on the characteristic line L2 for the restriction process, the motor speed at the operating point corresponding to the same motor torque is lower than that on the characteristic line L1 for the non-restriction process. When the restriction process is not being executed, the motor speed is set using the characteristic line L1. When the restriction process is being executed, the motor speed is set using the characteristic line L2. Therefore, as shown in FIG. 4, under the condition that the motor torque is the same, by starting the restriction process, the motor speed shifts from the value a1, which is set when the restriction process is not being executed, to the lower value a2. This reduces the required power of the driving motors.

Also, at the time of executing the restriction process, the value X used for determining the weighting coefficients $\alpha 1$, $\alpha 2$ in the equation (1) may be set to a value greater than 0.5. In this case, the weighting coefficient $\alpha 1$ becomes greater than the weighting coefficient $\alpha 2$ in the equation (1), and the restriction applied to the driving of the traveling motor 23 becomes less than the restriction applied to the driving of the cargo handling motor 24. By doing this, the restriction process that emphasizes the vehicle traveling rather than the cargo handling operation is executed, which reduces the discomfort experienced by the operator.

With the execution of such a restriction process, the SOC of the capacitor 39 rises gradually after the point in time t2 as shown in FIG. 5B.

In FIG. 6, the fuel cell system ECU 37 determines whether the SOC of the capacitor 39 is greater than or equal to the threshold value Vth2 (see FIG. 5B), which is greater than the threshold value Vth1, at step S4. When the SOC of the capacitor 39 recovers to a value greater than or equal to the threshold value Vth2 as indicated at a point in time t3 as shown in FIG. 5B, the fuel cell system ECU 37 moves to step S5 and turns off the restriction command to the vehicle ECU 43 as shown in FIG. 5C so as to cancel the restriction on the driving of the driving motors (the traveling motor 23 and the cargo handling motor 24). That is, the fuel cell system ECU 37 sends a restriction cancelling signal to the vehicle ECU 43 to end the restriction process.

At step S14 in FIG. 7, the vehicle ECU 43 determines whether the restriction command is in the off state, that is, whether it has received the restriction cancelling command signal. When determining that the restriction command is in the off state, the vehicle ECU 43 ends the restriction process at step S15. In the present embodiment, the restriction process ended when the SOC of the capacitor 39 is recovered to the fixed threshold value Vth2 or a value greater than that. However, the restriction process may be ended when both the cargo handling operation and the vehicle traveling are ended, that is, when the driving motors stop driving.

As described above, when the SOC of the capacitor 39 becomes less than or equal to the fixed threshold value Vth1, a restriction command is sent from the fuel cell system ECU 37 to the vehicle ECU 43. Upon receipt of the restriction command, the vehicle ECU 43 immediately restricts the vehicle-side output (driving of the motors). The driving of the traveling motor 23 and the cargo handling motor 24, which occupies most of the vehicle-side output, is restricted. Such restriction on the driving of the motors is achieved by restricting the motor speeds.

Conventionally, for example, when a vehicle goes up a steep hill with a heavy cargo, the power required for the vehicle system 30 may exceed the rating of the fuel cell system 22. If such a state continues for a long time or frequently occurs, the fuel cell system 22 must stop the fuel cell system 22 and shut down the vehicle system 30 in an emergency in order to protect the capacitor 39 from overdischarge, for example, when a high load state has continued in which the required power corresponding to the operated amounts of the operating members of the vehicle exceeds the continuous rating or the short-time rating.

In the present embodiment, by applying restriction on the driving of the traveling motor 23 and the cargo handling motor 24, which accounts for most of the output of the vehicle system 30, the fuel cell system ECU 37 and the vehicle ECU 43 cooperate with each other to restrict the output of the vehicle system 30. Specifically, the output of the vehicle system 30 is restricted through restriction on the motor speeds.

As a result, it is possible to prevent situations where the system stops due to the overdischarge of the capacitor 39.

For example, if the SOC were to drop to the lower limit value Vth5 at a point in time t10 as shown by the long dashed double-short dashed line in FIG. 5B, the system would stop. In the present embodiment, when the SOC drops to the threshold value Vth1, which is greater than the system stopping lower limit value Vth5, restriction is imposed on the driving of the motors. As a result, the SOC of the capacitor 39 is prevented from lowering, so that the traveling of the vehicle and the cargo handling operation are continued without the SOC of the capacitor 39 dropping to the lower limit value Vth 5. That is, it is unnecessary to stop the vehicle system 30 in an emergency, and it is possible to avoid hindrance to operations and the like.

The above-described embodiment has the following advantages.

(1) The fuel cell vehicle, in particular, the fuel cell forklift 10, which is a fuel cell industrial vehicle, includes in-vehicle electric loads including the traveling motor 23 and the cargo handling motor 24, the fuel cell stack 31, which is electrically connected to the in-vehicle electric loads, and the capacitor 39, which is electrically connected to the fuel cell stack 31 so as to be connected in parallel to the in-vehicle electric loads. The terminal voltage measuring device 40 and the fuel cell system ECU 37, which constitute an SOC detection sensor, detect the SOC of the capacitor 39. The fuel cell system ECU 37, which serves as a control means, controls the power generated by the fuel cell stack 31 based on the detected SOC of the capacitor 39. The in-vehicle electric loads include the driving motors (23, 24), which are driven based on the operation of the operating members (19, 20, 21). When the detected SOC of the capacitor 39 falls to or below the threshold value Vth1, the fuel cell system ECU 37 executes the restriction process to apply restriction on the driving of the driving motors (23, 24) via the vehicle ECU 43. Therefore, the SOC of the capacitor 39 is restrained from falling to or below the threshold value Vth1, so that the situation is prevented where the fuel cell system 22 stops in order to protect the capacitor 39. This allows the traveling or the cargo handling operation to be continued.

(2) The fuel cell system ECU 37 executes the restriction process such that the output power of the fuel cell system 22 is greater than or equal to the power required by the driving motors (23, 24). This allows the capacitor 39 to be charged during execution of the restriction process. This configuration is thus practical.

(3) The fuel cell system ECU 37 executes the restriction process by adjusting the speeds of the driving motors (23, 24). This restriction process is simple and practical.

(4) The driving motors include the traveling motor 23 and the cargo handling motor 24. When executing the restriction process, the fuel cell system ECU 37 makes the restriction applied to the driving of the traveling motor 23 less than the restriction applied to the driving of the cargo handling motor 24. By doing this, the restriction process that emphasizes the vehicle traveling rather than the cargo handling operation is executed, which reduces the discomfort experienced by the operator.

(5) The fuel cell system ECU 37 ends the restriction process when the detected SOC of the capacitor 39 recovers to a value greater than or equal to the threshold value Vth2 after starting the restriction process. Therefore, the restriction process will not be continued more than necessary.

The present invention is not limited to the above described embodiment, but may be modified as follows.

The SOC of the capacitor 39 is estimated based on the terminal voltage Vt of the capacitor 39 or the like, but the present invention is not limited thereto, and the SOC of the capacitor 39 may be detected by another method. For example, the SOC of the capacitor 39 may be detected by integrating the current input to and output from the capacitor 39.

As the power storage device, the capacitor 39 is used. However, instead of this, a rechargeable battery may be used as the power storage device.

The restriction process may be executed to satisfy, instead of the expression (1), the expression (A−B) ($\alpha1 \times C + \alpha2 \times D + E$). Even when (A−B)=($\alpha1 \times C + \alpha2 \times D + E$), the system will not stop.

Although it is desirable to constantly estimate the motor efficiency and the inverter efficiency from the actual motor speed. If such estimation cannot be performed due to ECU constraints or the like, these values may be set to default values (fixed values) in advance.

The present invention may be employed in industrial vehicles other than forklifts. For example, the present invention may be employed in a towing vehicle or the like used at an airport or the like. Alternatively, the present invention may be employed in vehicles other than industrial vehicles, for example, passenger cars and buses.

The invention claimed is:
1. A fuel cell vehicle comprising:
an in-vehicle electric load;
a fuel cell stack, which is electrically connected to the in-vehicle electric load;
a power storage device, which is electrically connected to the fuel cell stack so as to be electrically connected in parallel to the in-vehicle electric load;

a state-of-charge sensor, which is configured to detect a state of charge of the power storage device; and circuitry that is configured to control a power generated by the fuel cell stack based on the state of charge of the power storage device detected by the state-of-charge sensor, wherein the in-vehicle electric load includes a driving motor that is configured to be driven based on operation of an operating member, the circuitry is configured such that, when the state of charge of the power storage device detected by the state-of-charge sensor falls to or below a threshold value, the circuitry executes a restriction process to apply restriction on driving of the driving motor, the driving motor includes a traveling motor, which is used for traveling of the fuel cell vehicle, and a cargo handling motor, which is used for a cargo handling operation, and the circuitry is configured such that, when the restriction process is executed, the circuitry makes restriction applied to driving of the traveling motor less than restriction applied to driving of the cargo handling motor.

2. The fuel cell vehicle according to claim 1, further comprising a fuel cell system, wherein the fuel cell system includes the fuel cell stack and is configured to output power generated by the fuel cell stack, and the circuitry is configured to execute the restriction process such that an output power of the fuel cell system becomes greater than or equal to a required power of the driving motor.

3. The fuel cell vehicle according to claim 1, wherein the circuitry is configured to execute the restriction process by adjusting a speed of the driving motor.

4. The fuel cell vehicle according to claim 1, wherein the threshold value is a first threshold value, the circuitry is configured such that, after starting the restriction process, the circuitry ends the restriction process when the state of charge of the power storage device detected by the state-of-charge sensor recovers to a value greater than or equal to a second threshold value, which is greater than the first threshold value.

5. A method for controlling a fuel cell vehicle, the fuel cell vehicle including a driving motor that is configured to be driven based on operation of an operating member, the driving motor including a traveling motor, which is used for traveling of the fuel cell vehicle, and a cargo handling motor, which is used for a cargo handling operation, a fuel cell stack, which is electrically connected to the driving motor, and a power storage device, which is electrically connected to the fuel cell stack so as to be electrically connected in parallel to the driving motor, the method comprising:

detecting a state of charge of the power storage device;

controlling a power generated by the fuel cell stack based on the detected state of charge of the power storage device;

executing a restriction process to apply restriction on driving of the driving motor when the detected state of charge of the power storage device falls to or below a threshold value; and making restriction applied to driving of the traveling motor less than restriction applied to driving of the cargo handling motor when the restriction process is executed.

* * * * *